United States Patent
Luck et al.

(10) Patent No.: US 7,213,015 B1
(45) Date of Patent: May 1, 2007

(54) STORING AND DELIVERING PROGRAM CODE FOR MANIPULATION OF A USER-DEFINED DATA TYPE

(75) Inventors: Colin Luck, Redondo Beach, CA (US); Pierre Colin, Torrance, CA (US)

(73) Assignee: NCR Corporation, Dayton, OH (US)

( * ) Notice: Subject to any disclaimer, the term of this patent is extended or adjusted under 35 U.S.C. 154(b) by 470 days.

(21) Appl. No.: 10/750,368

(22) Filed: Dec. 31, 2003

(51) Int. Cl.
*G06F 17/30* (2006.01)

(52) U.S. Cl. .......................... 707/3; 707/100; 707/101; 707/102; 707/203

(58) Field of Classification Search ..................... 707/3
See application file for complete search history.

(56) References Cited

U.S. PATENT DOCUMENTS

| | | | | |
|---|---|---|---|---|
| 5,644,768 A | * | 7/1997 | Periwal et al. ............... | 718/102 |
| 6,941,316 B2 | * | 9/2005 | Venkatesh et al. .......... | 707/101 |
| 6,968,503 B1 | * | 11/2005 | Chang et al. ................ | 715/526 |
| 2003/0191769 A1 | * | 10/2003 | Crisan et al. ................ | 707/100 |
| 2004/0267766 A1 | * | 12/2004 | Marek et al. ................ | 707/100 |
| 2005/0050054 A1 | * | 3/2005 | Clark et al. .................. | 707/100 |
| 2005/0055354 A1 | * | 3/2005 | Thompson et al. ......... | 707/100 |
| 2005/0091183 A1 | * | 4/2005 | Cunningham et al. ......... | 707/1 |
| 2005/0203950 A1 | * | 9/2005 | Rajan et al. ............ | 707/103 R |

* cited by examiner

*Primary Examiner*—Don Wong
*Assistant Examiner*—Binh Van Ho
(74) *Attorney, Agent, or Firm*—John Cowert

(57) ABSTRACT

A database system carries out a technique for use in delivering data of a user-defined type to a requesting system. The system first receives a request from the requesting system for data of the user-defined type. The system then identifies a storage location for the requested data, as well as a storage location for program code designed to allow manipulation of the requested data on the requesting system. The system then retrieves both the requested data and the program code from their respective storage locations and delivers both the requested data and the program code to the requesting system.

6 Claims, 6 Drawing Sheets

STORING AND DELIVERING PROGRAM CODE FOR MANIPULATION OF A USER-DEFINED DATA TYPE

BACKGROUND

As rapid advancements in technology have brought about dramatic changes in the distribution of information in recent years, the managers of commercial data repositories have seen rapid increases in the amounts and types of information that they are asked to store. The growing popularity of multimedia information, for example—including items such as photographic images, video and audio clips, and animation clips—has forced the manufacturers and owners of data repositories to overhaul the ways in which they manage the information they keep. Relational database systems, which have traditionally been used to manage only information that is easily divided into a row-and-column format, now must handle more complex data types that do not conform readily to relational data structures.

Manufacturers of relational database systems have for years attempted to accommodate these more complex data types by treating them as "objects," or large groups of data that each can be stored and treated as a single entity. Quite often, a database system stores separately in its relational structure the data that makes up an object—such as a binary bitmap that forms a photographic image—and a set of descriptive data, or "metadata," that describes the object.

In general, however, the database system does not allow for easy manipulation of object data on the client side. For example, the vast majority of database systems do not support object-oriented design of user-defined data types (UDTs) on client systems in traditional database-query languages, such as the Structured Query Language (SQL), instead requiring more time-consuming coding through programming languages such as C++. Even the most sophisticated of relational database systems present object data, including UDTs, to the client in ways that severely limit the manner and environment in which the client can use that data. These limitations include an inability to move object data among non-compatible hardware platforms and a lack of support for multiple versions of a UDT. Database systems also do not allow the execution of methods on UDTs on the client side. Client systems that modify the data of a UDT cannot return the modified data to the database system.

SUMMARY

A database system carries out a technique for use in delivering data of a user-defined type to a requesting system. The system first receives a request from the requesting system for data of the user-defined type. The system then identifies a storage location for the requested data, as well as a storage location for program code designed to allow manipulation of the requested data on the requesting system. The system then retrieves both the requested data and the program code from their respective storage locations and delivers both the requested data and the program code to the requesting system.

Other features and advantages will become apparent from the description and claims that follow.

DETAILED DESCRIPTION

Described below is a technique that allows easy client-side manipulation of data of a user-defined type (UDT). The creator of the UDT, on creating the UDT, also creates program code that allows manipulation of data of the user-defined type and then stores this code in a database system along with the data of the user-defined type. When a client system requests data of the user-defined type, it also receives the program code, which typically is written in the same language as the UDT, typically the Structured Query Language (SQL), put forth by the American National Standards Institute (ANSI). The client system is able to store the program code so that it does not have to download the code each time the UDT is accessed. Storing the program code in this manner allows easy manipulation of UDTs across platforms and without distribution of software through traditional channels.

Figure 1:
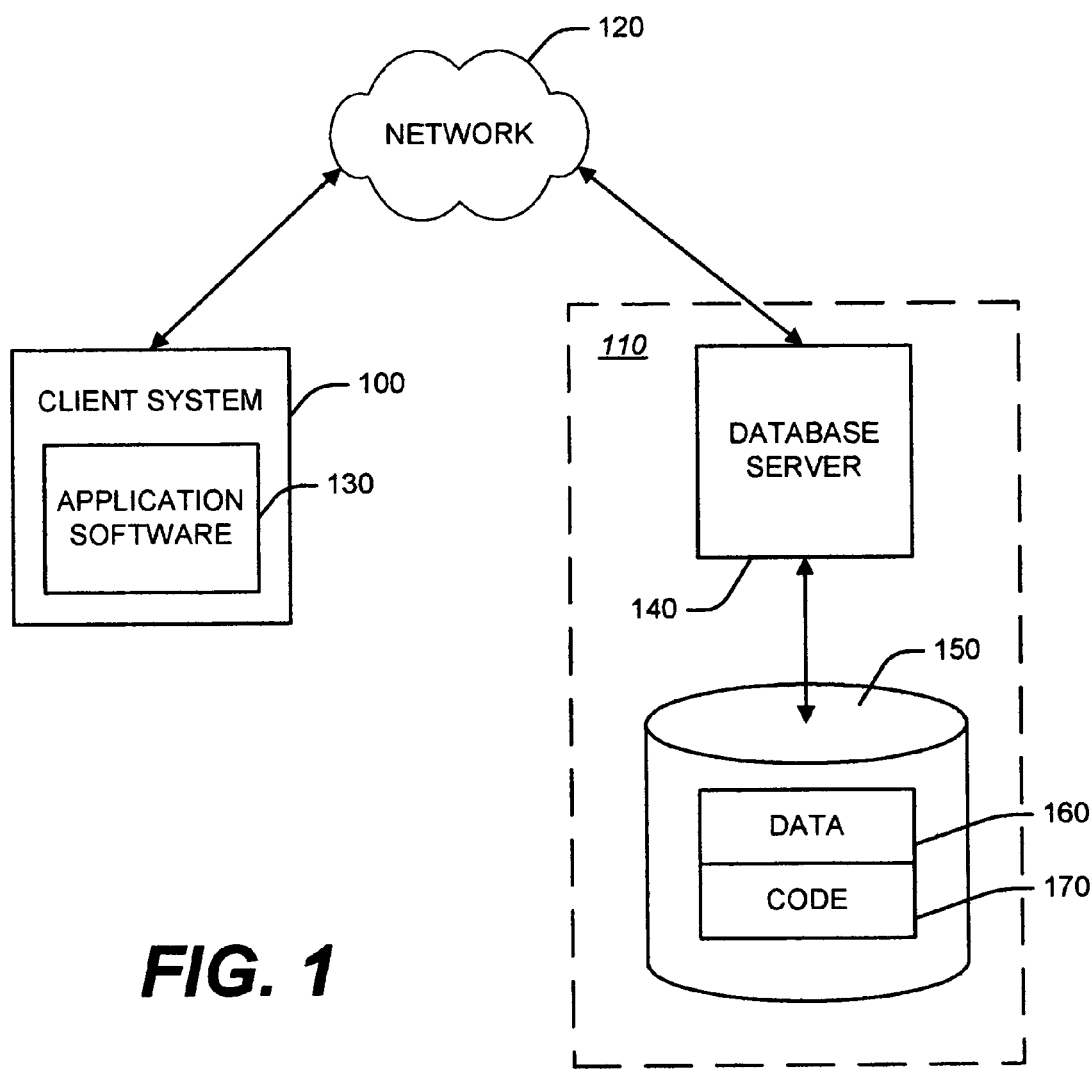
FIG. 1 is a schematic diagram of a database system and a client computer system.

FIG. 1 shows a system in which a client computer 100 interacts with a database system 110 through a computer network 120 in the storage and retrieval of data. The client computer 100 includes a processor and a data-storage facility that together allow the computer 100 to execute an application program 130. The application program 130 allows a user of the client computer 100 to create or to retrieve and then manipulate data that is stored in the database system 110.

The database system 110 includes a host computer system 140 connected to a data-storage facility 150 that stores a very large amount of data. As described in more detail below, the database system 110 typically includes a relational database-management system (DBMS) that stores data in relational tables. Included in this data is object data 160—such as multimedia data and data of a user-defined type (UDT)—that does not lend itself readily to the structure of a relational database. The data 160 of the UDT is stored in the data-storage facility 150 along with program code 170 that allows manipulation of the data, typically somewhere outside the relational table structure.

The program code 170 is written by the creator of the UDT and is designed to allow execution of data-manipulation operations—such as user-defined methods—that the creator wishes to perform on the data of the UDT. For example, for a UDT that includes geographical-location information derived from a map, the creator might include a manipulator that allows the calculation of distance between two points on the map. Instead of requiring systems that would access the map data to have previously stored the program code needed to calculate distance, the database system stores this code along with the data itself. On receiving a request for the geographical-location data, the database system delivers the distance-calculation code to the requesting system along with the requested data.

Figure 2:
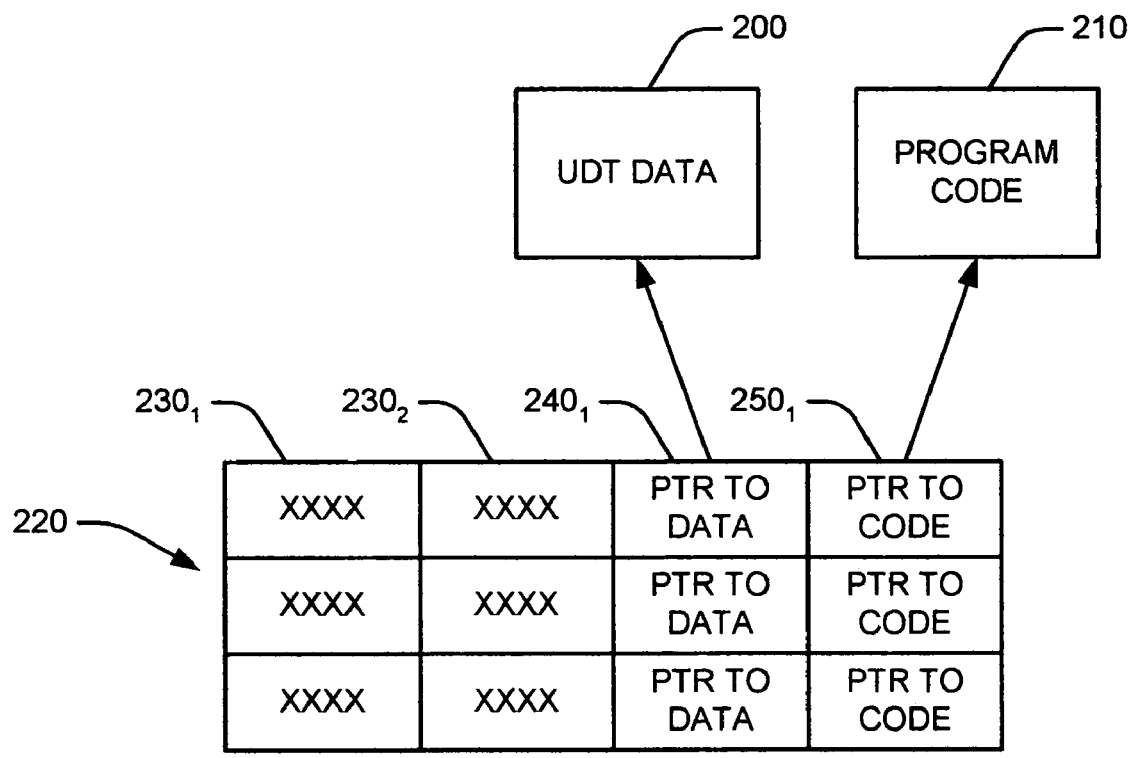
FIG. 2 is a diagram of a relational table in a database system.

FIG. 2 shows one way that the data 200 of a user-defined type and the corresponding program code 210 needed to manipulate that data are managed in a relational table 220 of a database system. The table 220 includes rows and columns that organize data according to some predefined relational structure. The data 200 of the UDT typically is not susceptible to storage in this relational structure, so the database system stores this data 200 elsewhere in the system. The table 220 instead stores metadata $230_1$, $230_2$ that describes the data 200 of the UDT, along with a pointer $240_1$ to the storage location of the data 200.

In addition to the pointer $240_1$ to the UDT data 200, the table 220 also stores a pointer $250_1$ to the storage location of the program code 210 that accompanies the UDT data. As with the UDT data 200, the program code 210 itself is stored somewhere in the database system other than in the relational table 220. When another computer system requests the data of the UDT, the database system accesses the table 220 to find the data needed to answer the request and to identify the corresponding program code.

Figure 3:
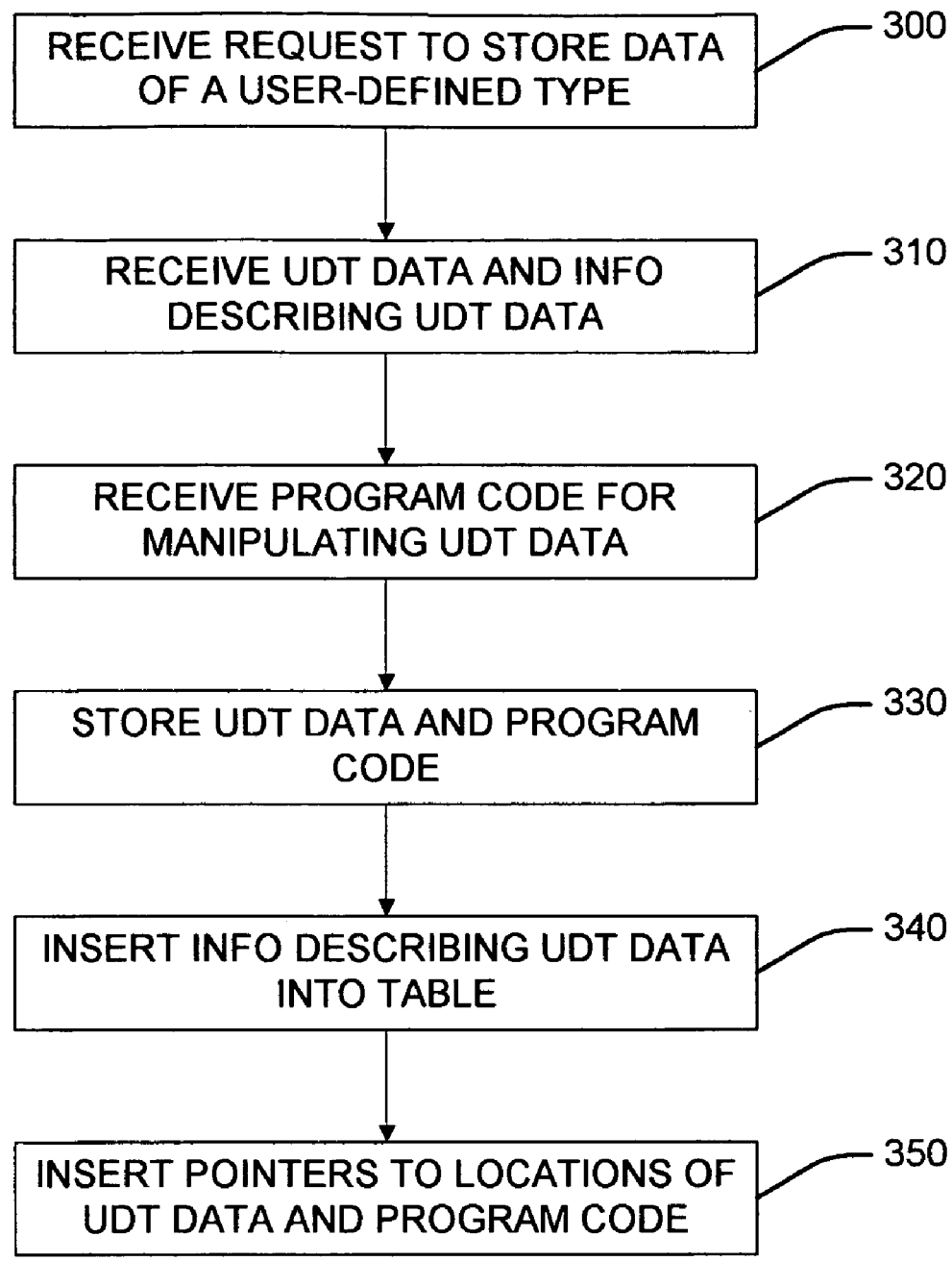
FIG. 3 is a flow chart of a technique for use in storing program code for use in manipulating data of a user-defined type along with the data.

FIG. 3 shows a technique for use in a database system in storing data of a user-defined type along with the program code needed to manipulate that data. On receiving a request to store data of a user-defined type (step 300), the database system receives the data along with information describing the UDT (step 310). The database system also receives the program code that is needed to manipulate the data of the UDT (step 320). The database system then stores both the UDT data and the program code in one of its data-storage facilities (step 330). The system also inserts at least some of the data describing the UDT into one or more relational tables (step 340) and, along with this data, inserts pointers to the storage locations of the UDT data and the corresponding program code (step 350).

Figure 4:
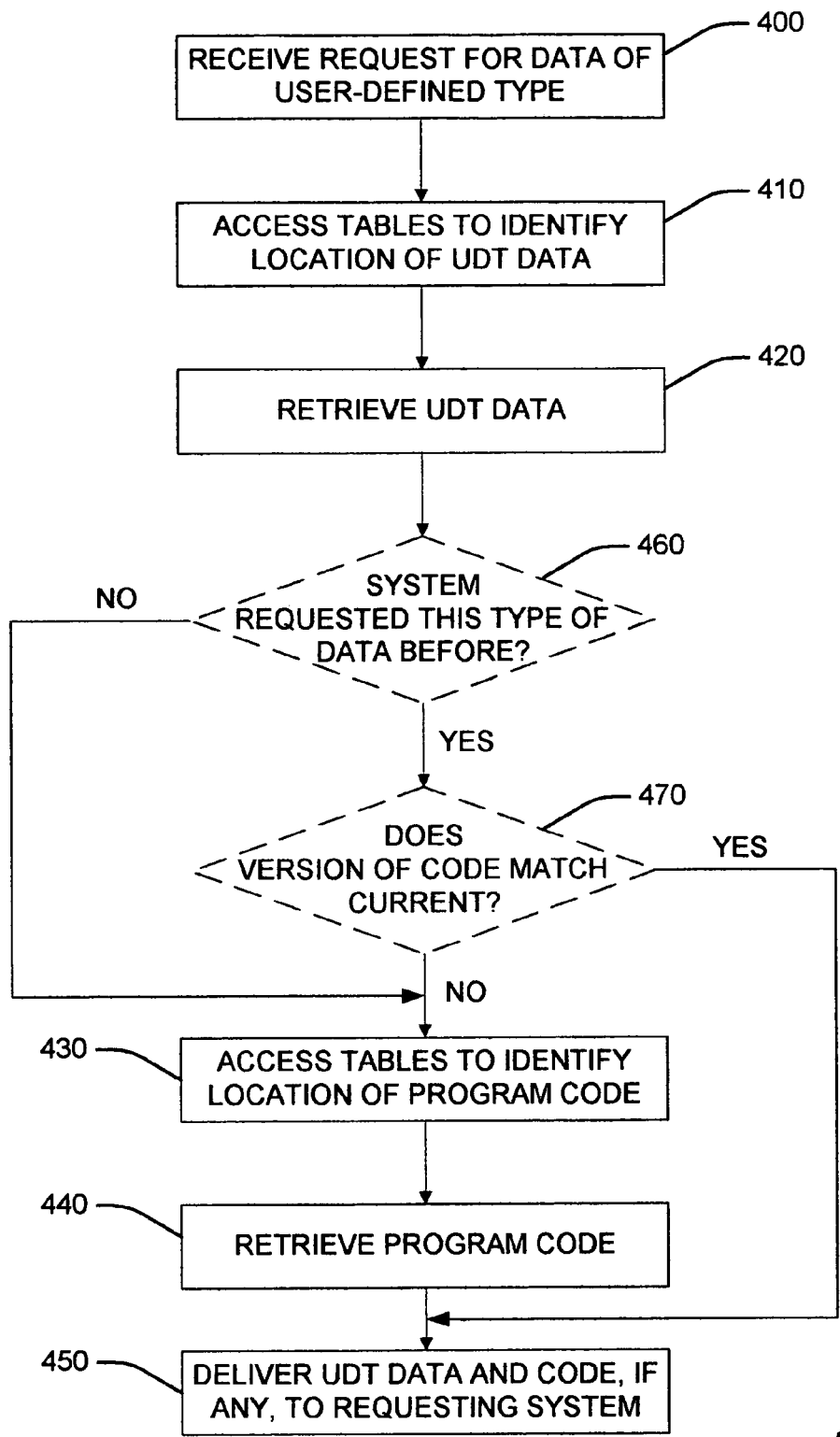
FIG. 4 is a flow chart of a technique for use in delivering program code for use in manipulating data of a user-defined type along with the data.

FIG. 4 shows a technique for use in the database system in retrieving the UDT data and the corresponding program code. On receiving a request for data of the user-defined type (step 400), the database system accesses its relational tables to identify the location of the data needed to answer the request (step 410). The system also searches the tables for the location of the corresponding program code, if any (step 430). On finding pointers to the data and the program code, respectively, the system retrieves the UDT data (step 420) and the corresponding code (step 440) from their storage locations and delivers both to the requesting system (step 450).

In some embodiments, the request for data includes information indicating whether the requesting computer has previously requested data of the user-defined type and, if so, which version of the program code the computer previously received. On receiving the request, the database system assesses whether the requesting computer has indeed requested that type of data (step 450). If so, the database system assesses which version of the program code the requesting computer received before (step 460). If that version matches the current version of the program code, the database system sends only the requested data without the program code (step 470). Otherwise, the system sends both the requested data and the corresponding code.

Figure 5:
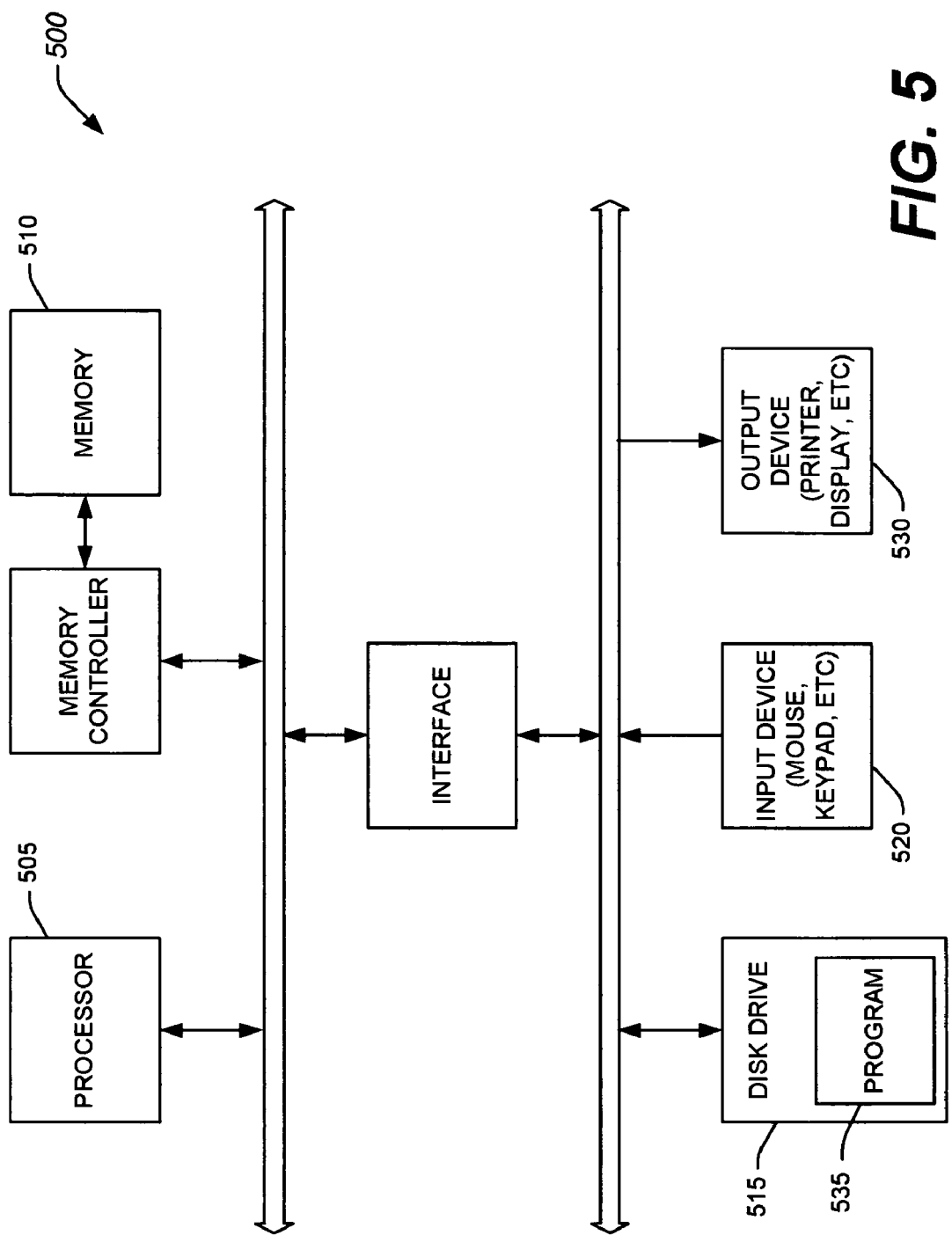
FIG. 5 is a schematic diagram of a computer system.

FIG. 5 shows a computer system 500 suited for use both as a client computer and as a host computer. In general, the computer 500 includes one or more processors 505, one or more temporary data-storage components 510 (e.g., volatile and nonvolatile memory modules), one or more persistent data-storage components 515 (e.g., optical and magnetic storage devices, such as hard and floppy disk drives, CD-ROM drives, and magnetic tape drives), one or more input devices 520 (e.g., mice, keyboards, and touch-screens), and one or more output devices 530 (e.g., display consoles and printers).

The computer 500 includes executable program code 535 that is usually stored in one of the persistent storage media 515 and then copied into memory 510 at run-time. The processor 505 executes the code by retrieving program instructions from memory in a prescribed order. When executing the program code, the computer receives data from the input and/or storage devices, performs operations on the data, and then delivers the resulting data to the output and/or storage devices.

In some embodiments, the computer is a special-purpose computer that performs only certain, specialized functions. In other embodiments, the computer is a general-purpose computer programmed to perform the necessary functions.

Figure 6:
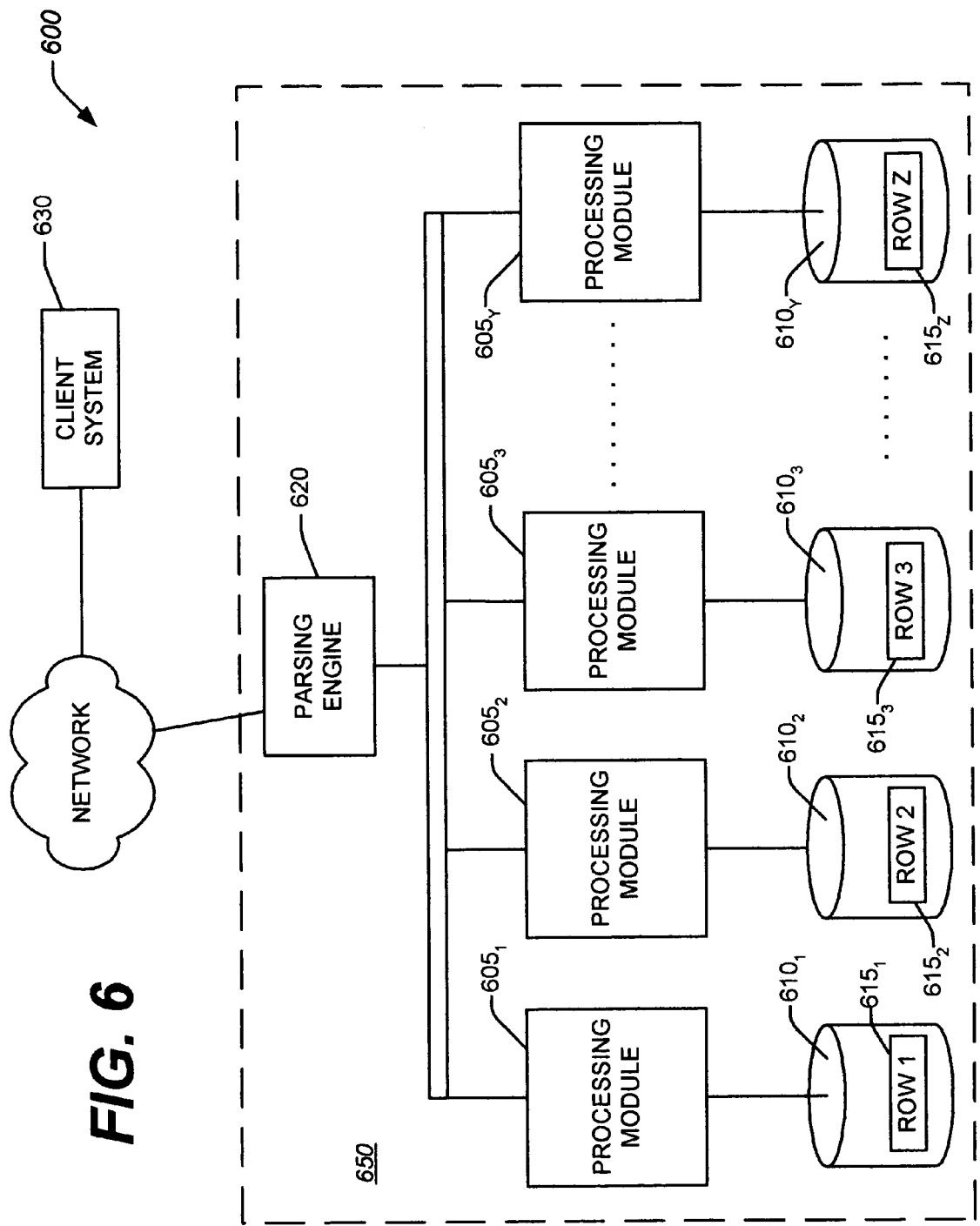
FIG. 6 is a schematic diagram of a database system.

FIG. 6 shows a data-warehouse system 600 that is suited for use in storing and retrieving the type of data and program code described above. In this example, the data-warehouse 600 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

As shown here, the data warehouse 600 includes one or more processing modules $605_{1\ldots Y}$ that manage the storage and retrieval of data in data-storage facilities $610_{1\ldots Y}$. Each of the processing modules $605_{1\ldots Y}$ manages a portion of a database that is stored in a corresponding one of the data-storage facilities $610_{1\ldots Y}$. Each of the data-storage facilities $610_{1\ldots Y}$ includes one or more disk drives.

The system stores data in one or more relational tables in the data-storage facilities $610_{1\ldots Y}$. The rows $615_{1\ldots Z}$ of the tables are stored across multiple data-storage facilities $610_{1\ldots Y}$ to ensure that the system workload is distributed evenly across the processing modules $605_{1\ldots Y}$. A parsing engine 620 organizes the storage of data and the distribution of table rows $615_{1\ldots Z}$ among the processing modules $605_{1\ldots Y}$. The parsing engine 620 also coordinates the retrieval of data from the data-storage facilities $610_{1\ldots Y}$ in response to queries received from a user at a mainframe or a client computer 630. The data warehouse usually receives queries in a standard format, such as the Structured Query Language (SQL) put forth by the American National Standards Institute (ANSI).

The text above describes one or more specific embodiments of a broader invention. The invention also is carried out in a variety of alternative embodiments and thus is not limited to those described here. Many other embodiments are also within the scope of the following claims.

We claim:

1. A computer-implemented method for use in delivering data of a user-defined type to a requesting system, the method comprising:
   receiving a request from the requesting system for data of the user-defined type;
   identifying a storage location for the requested data;
   identifying a storage location for program code designed to allow manipulation of the requested data on the requesting system;
   retrieving both the requested data and the program code from their respective storage locations;
   delivering both the requested data and the program code to the requesting system;
   receiving a subsequent request from the requesting system for data of the user-defined type; and
   in response, delivering the data requested in the subsequent request to the requesting system without delivering the program code.

2. A computer-implemented method for use in delivering data of a user-defined type to a requesting system, the method comprising:
- receiving a request from the requesting system for data of the user-defined type;
- identifying a storage location for the requested data;
- identifying a storage location for program code designed to allow manipulation of the requested data on the requesting system;
- retrieving both the requested data and the program code from their respective storage locations;
- delivering both the requested data and the program code to the requesting system;
- receiving a subsequent request from the requesting system for data of the user defined type, where the subsequent request includes version information identifying a version the program code delivered previously to the requesting system;
- comparing the version information to information identifying a current version of the program code; and
- if the two versions match, delivering the data requested in the subsequent request to the requesting system without delivering the program code.

3. A computer program, stored on a tangible storage medium, for use in delivering data of a user-defined type to a requesting system, the program comprising executable instructions that, when executed in the database system, cause the system to:
- receive a request from the requesting system for data of the user-defined type;
- identify a storage location for the requested data;
- identify a storage location for program code designed to allow manipulation of the requested data on the requesting system;
- retrieve both the requested data and the program code from their respective storage locations;
- deliver both the requested data and the program code to the requesting system;
- receive a subsequent request from the requesting system for data of the user-defined type; and
- in response, deliver the data requested in the subsequent request to the requesting system without delivering the program code.

4. A computer program, stored on a tangible storage medium, for use in delivering data of a user-defined type to a requesting system, the program comprising executable instructions that, when executed in the database system, cause the system to:
- receive a request from the requesting system for data of the user-defined type;
- identify a storage location for the requested data;
- identify a storage location for program code designed to allow manipulation of the requested data on the requesting system;
- retrieve both the requested data and the program code from their respective storage locations;
- deliver both the requested data and the program code to the requesting system;
- receive a subsequent request from the requesting system for data of the user defined type, where the subsequent request includes version information identifying a version the program code delivered previously to the requesting system;
- compare the version information to information identifying a current version of the program code; and
- if the two versions match, deliver the data requested in the subsequent request to the requesting system without delivering the program code.

5. A database system comprising:
- a data-storage facility; and
- a computer system connected to the data-storage facility and configured to:
  - receive a request from a requesting system for data of a user-defined type;
  - identify a storage location in the data-storage facility for the requested data;
  - identify a storage location in the data-storage facility for program code designed to allow manipulation of the requested data on the requesting system;
  - retrieve both the requested data and the program code from their respective storage locations;
  - deliver both the requested data and the program code to the requesting system;
  - receive a subsequent request from the requesting system for data of the user-defined type; and
  - in response, deliver the data requested in the subsequent request to the requesting system without delivering the program code.

6. A database system comprising:
- a data-storage facility; and
- a computer system connected to the data-storage facility and configured to:
  - receive a request from a requesting system for data of a user-defined type;
  - identify a storage location in the data-storage facility for the requested data;
  - identify a storage location in the data-storage facility for program code designed to allow manipulation of the requested data on the requesting system;
  - retrieve both the requested data and the program code from their respective storage locations;
  - deliver both the requested data and the program code to the requesting system;
  - receive a subsequent request from the requesting system for data of the user defined type, where the subsequent request includes version information identifying a version the program code delivered previously to the requesting system;
  - compare the version information to information identifying a current version of the program code; and
  - if the two versions match, deliver the data requested in the subsequent request to the requesting system without delivering the program code.

* * * * *